United States Patent
Persson et al.

(10) Patent No.: US 11,608,012 B2
(45) Date of Patent: Mar. 21, 2023

(54) LINING, A HAUL TRUCK BODY COMPRISING THE SAME AND A HAUL TRUCK

(71) Applicant: Metso Sweden AB, Trelleborg (SE)

(72) Inventors: Henrik Persson, Trelleborg (SE); Fredrik Larsson, Malmö (SE); Magnus Johansson, Trelleborg (SE); Peter Ahlberg, Trelleborg (SE); Niclas Hällevall, Lund (SE)

(73) Assignee: Metso Sweden AB, Trelleborg (SE)

( * ) Notice: Subject to any disclaimer, the term of this patent is extended or adjusted under 35 U.S.C. 154(b) by 46 days.

(21) Appl. No.: 16/623,640

(22) PCT Filed: Jun. 21, 2018

(86) PCT No.: PCT/EP2018/066652
§ 371 (c)(1),
(2) Date: Dec. 17, 2019

(87) PCT Pub. No.: WO2018/234497
PCT Pub. Date: Dec. 27, 2018

(65) Prior Publication Data
US 2020/0189488 A1 Jun. 18, 2020

(30) Foreign Application Priority Data
Jun. 22, 2017 (EP) ..................................... 17177445

(51) Int. Cl.
*B60P 1/28* (2006.01)
*B60R 13/01* (2006.01)

(52) U.S. Cl.
CPC .............. *B60R 13/01* (2013.01); *B60P 1/286* (2013.01)

(58) Field of Classification Search
CPC .. B60P 1/286; B60P 1/283; B60P 1/28; B60R 13/01; B60R 2013/015; B60R 13/011; B60R 2013/016; B60R 2013/018
(Continued)

(56) References Cited

U.S. PATENT DOCUMENTS

| | | | |
|---|---|---|---|
| 4,029,354 A * | 6/1977 | Valeri | ..................... B60P 1/286 296/39.2 |
| 5,207,472 A | 5/1993 | Gower | |

(Continued)

FOREIGN PATENT DOCUMENTS

| BR | PI0804221 A2 | 7/2010 |
|---|---|---|
| CN | 106794790 A | 5/2017 |

(Continued)

OTHER PUBLICATIONS

Search Report for corresponding Chilean Patent Application No. 201903691 dated Nov. 24, 2020.
(Continued)

*Primary Examiner* — Stephen T Gordon
(74) *Attorney, Agent, or Firm* — Andrus Intellectual Property Law, LLP

(57) ABSTRACT

The disclosure relates to a lining for a haul truck body, said lining being arranged to extend over a haul truck body for carrying a load, wherein the lining is formed by a plurality of lining elements comprising at least a first type of lining elements, termed load-breaking lining elements, and a second type of lining elements, different from the load-breaking lining elements, said load-breaking lining elements being structured and arranged to restrict, to a higher degree than the second type of lining elements, movement of said load in relation to the lining. The disclosure further relates to a haul truck body comprising the lining and a haul truck comprising the haul truck body.

12 Claims, 4 Drawing Sheets

(58) Field of Classification Search
USPC ....... 298/7, 17 R, 22 R, 22 P; 296/39.1, 39.2
See application file for complete search history.

(56) References Cited

U.S. PATENT DOCUMENTS

| | | | |
|---|---|---|---|
| 5,648,031 A | 7/1997 | Sturtevant et al. | |
| 5,814,398 A | 9/1998 | Kronz et al. | |
| 6,126,999 A | 10/2000 | Tomasino et al. | |
| 6,174,014 B1 | 1/2001 | Hook et al. | |
| 6,283,527 B1* | 9/2001 | Desmarais | B60P 1/00 296/39.2 |
| 6,305,731 B1 | 10/2001 | Hook et al. | |
| 6,431,629 B1 | 8/2002 | Emery | |
| 10,232,801 B2 | 3/2019 | Chewning et al. | |
| 2001/0041221 A1 | 11/2001 | Kaufold et al. | |
| 2011/0181067 A1 | 7/2011 | Dunn et al. | |
| 2012/0032646 A1 | 12/2012 | Hagenbuch | |
| 2012/0326463 A1* | 12/2012 | Hagenbuch | B60P 1/286 296/39.2 |
| 2014/0354004 A1 | 12/2014 | Burstrom | |
| 2015/0061311 A1 | 3/2015 | Natarajan et al. | |

FOREIGN PATENT DOCUMENTS

| | | |
|---|---|---|
| DE | 10325231 A1 | 12/2004 |
| RU | 2032558 C1 | 4/1995 |
| SU | 1311963 A1 | 5/1987 |
| UA | 112176 C2 | 8/2016 |
| UA | 114614 C2 | 7/2017 |

OTHER PUBLICATIONS

Decision to Grant and Search Report for corresponding Russian Application No. 2019141319/11 dated Oct. 25, 2021.
Office Action and Search Report for corresponding Chinese Application No. 201880040906.2 dated Jul. 23, 2021.
Office Action and Search Report for corresponding Chinese Application No. 201880040898.1 dated Jul. 5, 2021.
International Search Report and Written Opinion for International Application No. PCT/EP2018/066652 dated Oct. 9, 2018.
Notice of Allowability for corresponding Ukrainian Patent Application No. 201911838 dated Jan. 18, 2022.
Notice of Allowability for corresponding Ukrainian Patent Application No. 201911840 dated Jan. 18, 2022.
Notification of Granting Patent Right for corresponding Chinese Patent Application No. 2018800408981 dated Mar. 3, 2022.

* cited by examiner

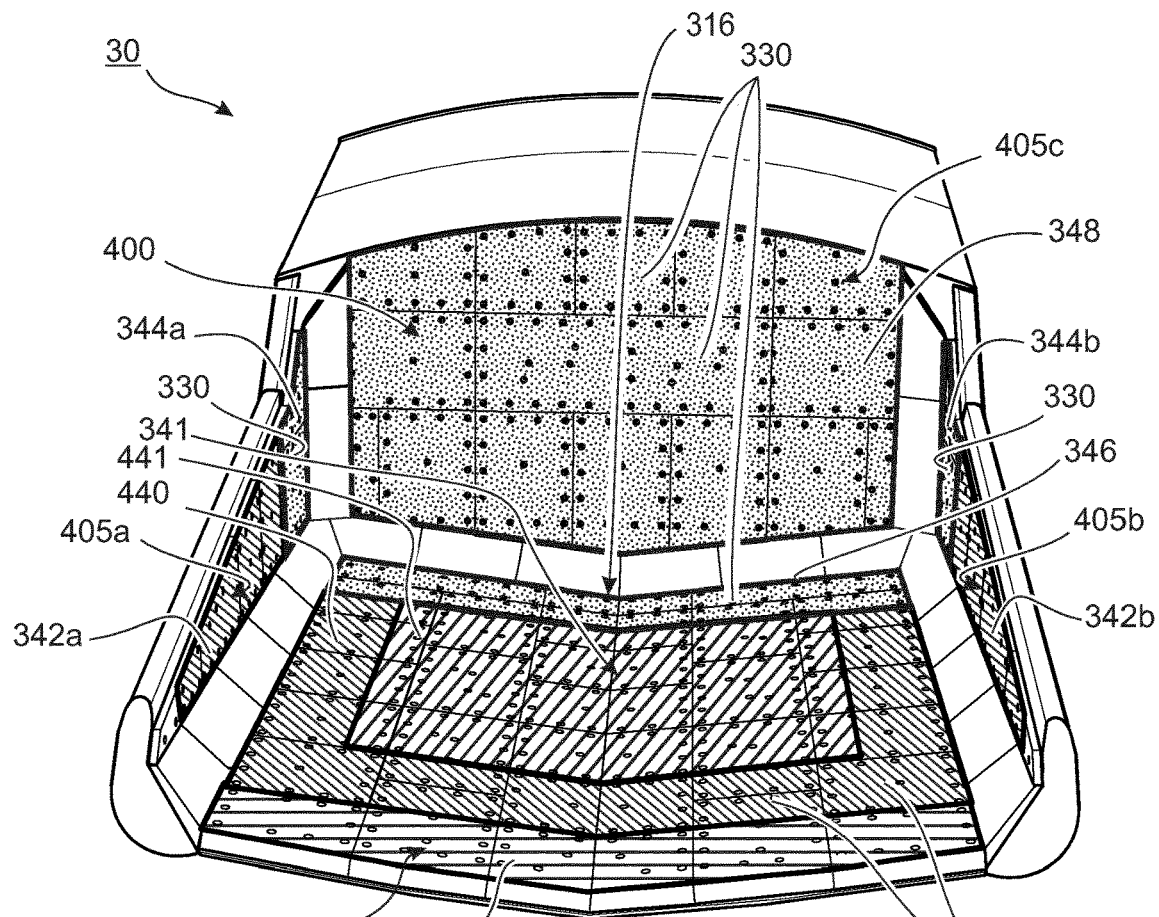
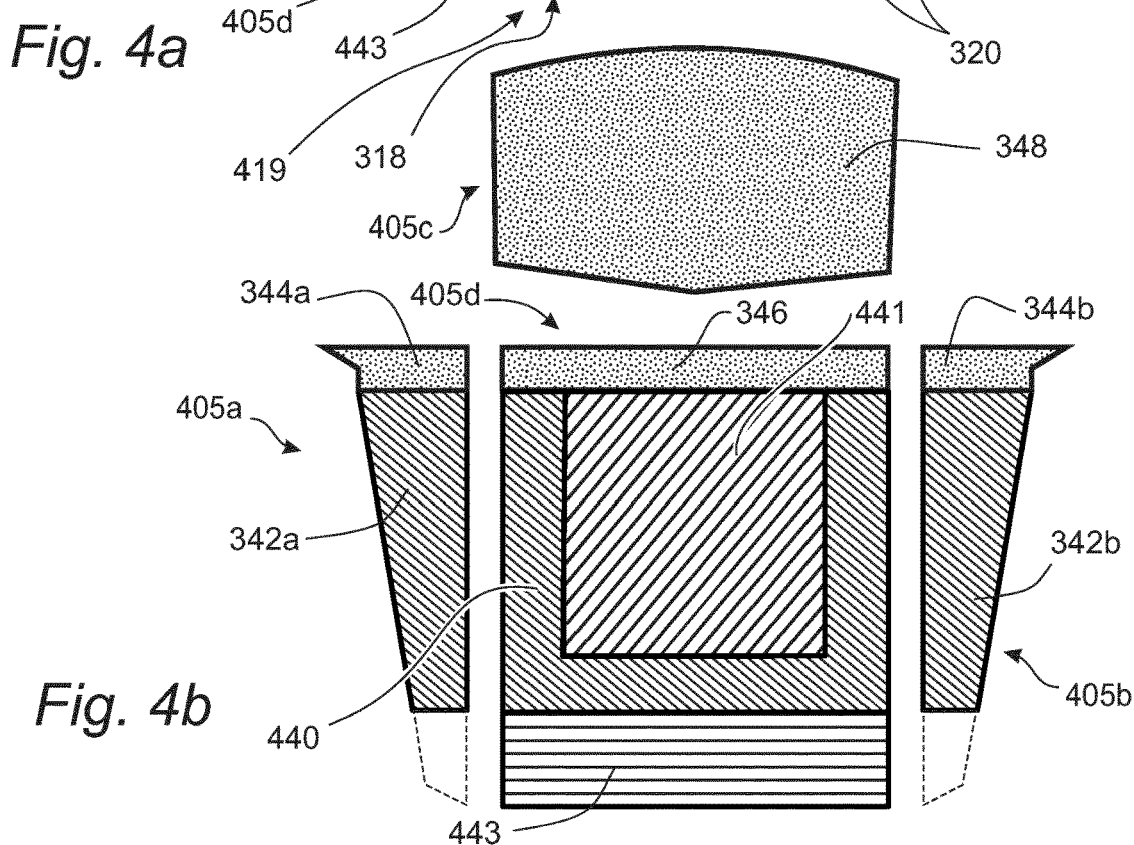
Fig. 4a
Fig. 4b

LINING, A HAUL TRUCK BODY COMPRISING THE SAME AND A HAUL TRUCK

CROSS-REFERENCE TO RELATED APPLICATIONS

This application is the U.S. national stage application of International Application PCT/EP2018/066652, filed Jun. 21, 2018, which international application was published on Dec. 27, 2018, as International Publication WO 2018/234497 A1 in the English language. The International Application claims priority of European Patent Application No. 17177445.8 filed Jun. 22, 2017.

TECHNICAL FIELD

The disclosure relates to a lining for a haul truck body. The disclosure further relates to a haul truck body comprising the lining and to a truck comprising the haul truck body.

BACKGROUND

Haul trucks are off-highway dump trucks engineered for use in high-production mining and heavy-duty construction environments. The haul trucks are equipped with haul truck bodies capable of accommodating a large amount of material, such as rock, crushed ore or the like. Haul truck capacities range from 40 short tons (36 t) to 496 short tons. Hauling such masses of often sharp and heavy load makes the haul truck body experiencing a heavy wear due to impact and abrasion.

To protect the surface of the haul truck body, it is common to equip the interior of the haul truck body with a lining. The lining is typically made from materials having a high degree of resistance for damage. Whereas the haul truck body usually is made from steel, the lining material is often made from another material. One commonly used type of lining is an elastic lining comprising for example a rubber material or polyurethane. An advantage of the elastic lining material is that its material properties may be used to mitigate the effects of heavy impact of material on the haul truck body as material is hauled from quite some altitude onto the haul truck body from for example an excavator. The elastic lining material effectively absorbs the energy from the impact distributing said energy over a larger area, thus preventing damage to the haul truck body and/or structural parts of the haul truck, such as beams, shafts, tires etc. Lining elements for haul trucks may also comprise less elastic materials as separate layers of the lining elements and/or as embedded inlays in the lining element. Such lining elements are specifically resistant to damage due to abrasive wear. Another advantage with the lining is that it may contribute in keeping the load more stable, supported on the lining of the haul truck body, during transport. Lining for haul trucks are usually made from a plurality of lining elements extending over surfaces of the haul truck body to form the lining. The separate lining elements simplifies manufacture by limiting its dimensions and mass. Moreover, it facilitates service of the haul truck body, as individual damaged or worn-out lining elements may be exchanged directly on site without having to remove large parts of the surrounding lining.

Still, however, there is a need in the art to provide an improved lining with improved properties.

SUMMARY OF INVENTION

In the light of the above, it is an object of the present disclosure to provide an improved lining for a haul truck body.

According to a first aspect, there is provided a lining being arranged to extend over a haul truck body for carrying a load, wherein the lining is formed by a plurality of lining elements comprising at least a first type of lining elements, termed load-breaking lining elements, and a second type of lining elements, different from the load-breaking lining elements, said load-breaking lining elements being structured and arranged to restrict, to a higher degree than the second type of lining elements, movement of said load in relation to the lining.

The lining according to the first aspect presents at least the following advantages:

By using lining elements with a higher degree of load-braking properties, termed load-braking lining elements, which are structured and arranged to restrict, to a higher degree than a second type of lining elements, movement of said load in relation to the lining, the lining may be designed such as to prevent, at one or more regions where needed, the load from moving as easy as it would have done on lining elements having a lesser degree of load braking properties. In other words, the risk of the whole load accidently starting to slide on top of the lining may be reduced. This may be advantageous for at least two reasons:

The load may be kept more stable, supported on the lining of the haul truck body, during transport. Haul trucks are often operated on inclined and irregular road surfaces and the risk of accidently releasing parts of the load is sometimes high.

The load may be prevented from being transiently released during tipping, i.e. when the haul truck body is pivoted for releasing the load. The transiently releasing occurs due to the load of the haul truck suddenly losing its grip with the surface of the lining, resulting in the load sliding backwards over the surface of the lining basically all at once as a sliding pile of material. The sliding results in a relatively fast variation of the center of mass in relation to the haul truck, putting high degree of strain to the structural parts of the haul truck, such as bearings, hydraulic systems etc. When tipping a haul truck body provided with a lining of the disclosure, the risk of the entire load starting sliding on the lining will be reduced. By tailoring the load-breaking properties of the lining, it may be achieved that the upper portions of the load will start moving on top of the lower portions of the load to be released at a tipping end of the haul truck body. As the tilting angle increases, more of the load will be released, subsequently ending with the bottom portion which is in contact with the lining. Thus, the inventive concept may reduce the risk that the release of the load will show the transient behavior expected from a conventional haul truck body of steel and/or equipped with a conventional lining having less strong load-breaking properties, a transient behavior characterized by a sudden onset of movement as the load loses its grip to the lining upon which it resides.

Using specific lining elements with different load-breaking properties for different regions of the haul truck body may achieve the advantages disclosed hereinabove, but, additionally, further advantages. One such advantage is to prevent the load from sticking to the lining which may increase the carry-back. The different regions are equipped with lining elements having different load-braking properties, i.e. lining elements being structured and arranged to restrict movement of a load in relation to the lining to a different degree. By using load-braking lining elements on selected regions of the haul truck body and a second type of lining elements, different from the load-breaking lining elements, on other regions of the haul truck body, a lining may be provided having reduced degree of sticking, and thus reduced carry back, while at the same time having a higher degree of load-braking capability.

Furthermore, by using specific kinds of lining elements in limited regions, it may be overall cost-effective to make use of more expensive lining in that region, lining elements which would not be cost effective to use over the whole lining.

According to some embodiments, the load-carrying surfaces of the load-breaking lining elements present, compared to load-carrying surfaces of the lining elements of the second type, a higher surface friction for restricting movement of the load in relation to the lining.

According to some embodiments, the plurality of lining elements comprises an elastic material, such as rubber, and wherein the load-breaking lining elements, compared to the lining elements of the second type, comprises a softer elastic material arranged to be deformed by the weight of the load in order to restrict movement of the load in relation to the lining.

According to some embodiments, load-carrying surfaces of the load-breaking lining elements present, compared to load-carrying surfaces of the lining elements of the second type, a lower load-cohesion force for restricting movement of the load in relation to the lining.

According to some embodiments, the lining comprises a bottom lining, a front lining and two opposite side linings, and wherein the bottom lining comprises at least one load-breaking bottom region formed entirely or partly by load-breaking lining elements, and one or more further bottom regions, different from the load-breaking bottom region, formed entirely or partly by lining elements of the second type.

According to some embodiments, the load-breaking bottom region is arranged at least partly over a load-impact region of a forward part of the haul truck body.

According to some embodiments, the load-breaking bottom region is arranged at a distance from a front end of the bottom lining.

According to some embodiments, the load-breaking bottom region is arranged at a distance from a rear end of the bottom lining.

According to some embodiments, each one of said two opposite side linings comprises at least one load-breaking side region formed entirely or partly by load-breaking lining elements.

According to some embodiments, the second type of lining elements are designed as load-releasing lining elements which are structured and designed to promote, to a higher degree than the load-breaking lining elements, release of the load from the lining and/or movement of the load in relation to the lining.

According to some embodiments, at least some of said load-releasing lining elements are arranged in a front lining of said lining.

According to a second aspect, there is provided a haul truck body comprising a lining according to the first aspect.

According to a third aspect, there is provided a truck comprising a haul truck body according to the second aspect.

Hereinabove has been provided a description of an inventive concept. It is understood that many alternatives are available to the skilled person in realizing the inventive concept within the scope of the appended claims. Further to what has been detailed hereinabove, it is provided examples of such alternatives in what follows below.

In an example, there is disclosed a lining for a haul truck body, said lining being arranged to extend over surfaces of said haul truck body, wherein said surfaces define at least one impact region and at least one wear region;
  wherein said lining within said at least one impact region presents one or more impact lining elements;
  wherein said lining within said at least one wear region presents one or more wear lining elements; and
  wherein said impact lining elements have a higher impact resistance than said wear lining elements and said wear lining elements have a higher wear resistance than the impact lining elements.

The lining according to the example presents at least the following advantages:
  Using specific lining elements for different regions of the haul truck body achieves an improved overall resistance of the lining to the often aversive effects of material loaded into, and tipped out from, the haul truck body during use.
  By tailoring lining elements for resisting a specific kind of damage, the tailored lining elements may be made superior in resistance to that specific kind of damage.
  By using specific kinds of lining elements in limited regions, it may be overall cost-effective to make use of more expensive lining in that region, lining elements which would not be cost effective to use over the whole lining.

The at least one impact region may comprise a loading region extending over a part of a bottom surface of the haul truck body, wherein the at least one wear region comprises a tipping region extending over another part of the bottom surface of the haul truck body, and wherein the loading region is arranged in front of the tipping region.

The loading region and the tipping region may together extend over the entire bottom surface of the haul truck body. Alternatively, there loading region and the tipping region may together partially extend over the bottom surface of the haul truck body. Further regions may be arranged to extend over the bottom surface, such as for example a third region extending between the loading region and the tipping region.

The tipping region may extend to a rear end of the bottom surface of the haul truck body.

The loading region may extend forwardly from a center of the bottom surface of the haul truck body.

The at least one impact region may further comprise a further loading region extending over at least a part of a front surface of the haul truck body.

The one or more impact lining elements may have a larger thickness than the one or more wear lining elements.

The one or more impact lining elements and the one or more wear elements may comprise different materials.

The one or more impact lining elements and/or the one or more wear lining elements may comprise one or more from rubber, polyurethane, ceramics and metallic alloys. The rubber may be either synthetic or natural or a mix thereof.

The one or more impact lining elements may have a Young's modulus lower than a Young's modulus of the one or more wear lining elements.

The one or more wear lining elements may comprise one or more wear-resistant portions, or particles, at least partly embedded within the one or more wear lining elements and distributed over at least a part of an outwardly directed surface of the one or more wear lining elements, such that the one or more wear-resistant portions are arranged to make contact with material present in said haul truck body.

The one or more wear-resistant elements may comprise a ceramic material and/or a metallic alloy.

The one or more wear lining elements may comprise a wear layer facing the inside of the haul truck body and a mounting layer facing surfaces of the haul truck body, and wherein the wear layer comprises the one or more wear-resistant portions.

The one or more impact lining elements may comprise are a plurality of impact lining elements and the one or more wear lining elements comprises a plurality of wear lining elements.

Said plurality of impact lining elements may be arranged adjacent to each other such as together to form one or more areas of substantially uniform impact resistance, and wherein said plurality of wear lining elements are arranged adjacent to each other such as together to form areas of substantially uniform wear properties.

A haul truck body may comprise a lining according to the example disclosed hereinabove.

A truck may comprise a such a haul truck body.

The two types of lining elements presenting different load-breaking properties may be combined with the impact and wear lining elements. This may be achieved by using lining elements of four different types. Alternatively, less than four types of lining elements may be used. In such a case, some types may share functionality. For example, one type of lining elements may be used both as an impact lining element and as a load-breaking lining element.

Effects and features of the first aspect, are, when applicable, relevant also in connection with the subject matter disclosed in the example.

The above and other features of the inventive concept and preferred embodiments thereof are set out in the claims and will be described further in detail below.

Terminology

The term "lining element" is to be interpreted as an isolated physical element adapted to be positioned onto a surface or other structure such as to provide a protection thereof. A lining element may be planar, but may also be curved or three-dimensionally shaped. A lining element may comprise more than one material. A lining element may be shaped such as to fit together with adjacent lining elements to form a uniform common surface.

The term "region" should be understood as a region of the haul truck body which, in absence of lining elements thereon, would be directly exposed to material hauled by the haul truck body. Thus, the region may be a uniform surface, such as a bottom surface of a steel haul truck body. Alternatively, a region may, at least in part, comprise sub regions lacking a surface. For example, lining elements may be suspended over a frame structure of a haul truck body.

The term "impact region" would normally be a region of the haul truck body where the load is normally loaded, with resulting high impact on the haul truck body. Such impact would often be in the forward part of the haul truck body, such as in the front third of the bottom of the haul truck body.

The term "wear region" would normally be a region where the lining is predominantly subjected to wear by the load moving over the lining. Such a region may especially be located in the rear part of the haul truck body, such as at or close to the rear end of the bottom of the haul truck body.

The terms "in front of" and "rear" used in relation to the haul truck body should be interpreted as relating to a reference direction being the forward direction of a haul truck comprising the haul truck body.

The terms "elasticity" and "Young's modulus" when used in relation to a lining element should here be understood as effective values for the lining element. This implies that if a lining element is made from two or more materials each having a respective Young's modulus, the lining element may still be associated with a single effective Young's modulus, which for example may be determined experimentally.

Other features and advantages of embodiments of the present invention will become apparent to those skilled in the art upon review of the following drawings, the detailed description, and the appended claims.

BRIEF DESCRIPTION OF THE DRAWINGS

The inventive concept, some non-limiting embodiments and further advantages of the inventive concept will now be further described with reference to the drawings.

FIG. 2b is a cut-out view of the wear lining element shown in FIG. 2a

FIG. 3b is a top view of sections of the lining shown in FIG. 3a.

FIG. 4a illustrates a haul truck body having a lining according to some alternative embodiments of the disclosure.

FIG. 4b is a top view of sections of the lining shown in FIG. 4a.

DETAILED DESCRIPTION

Figure 1:
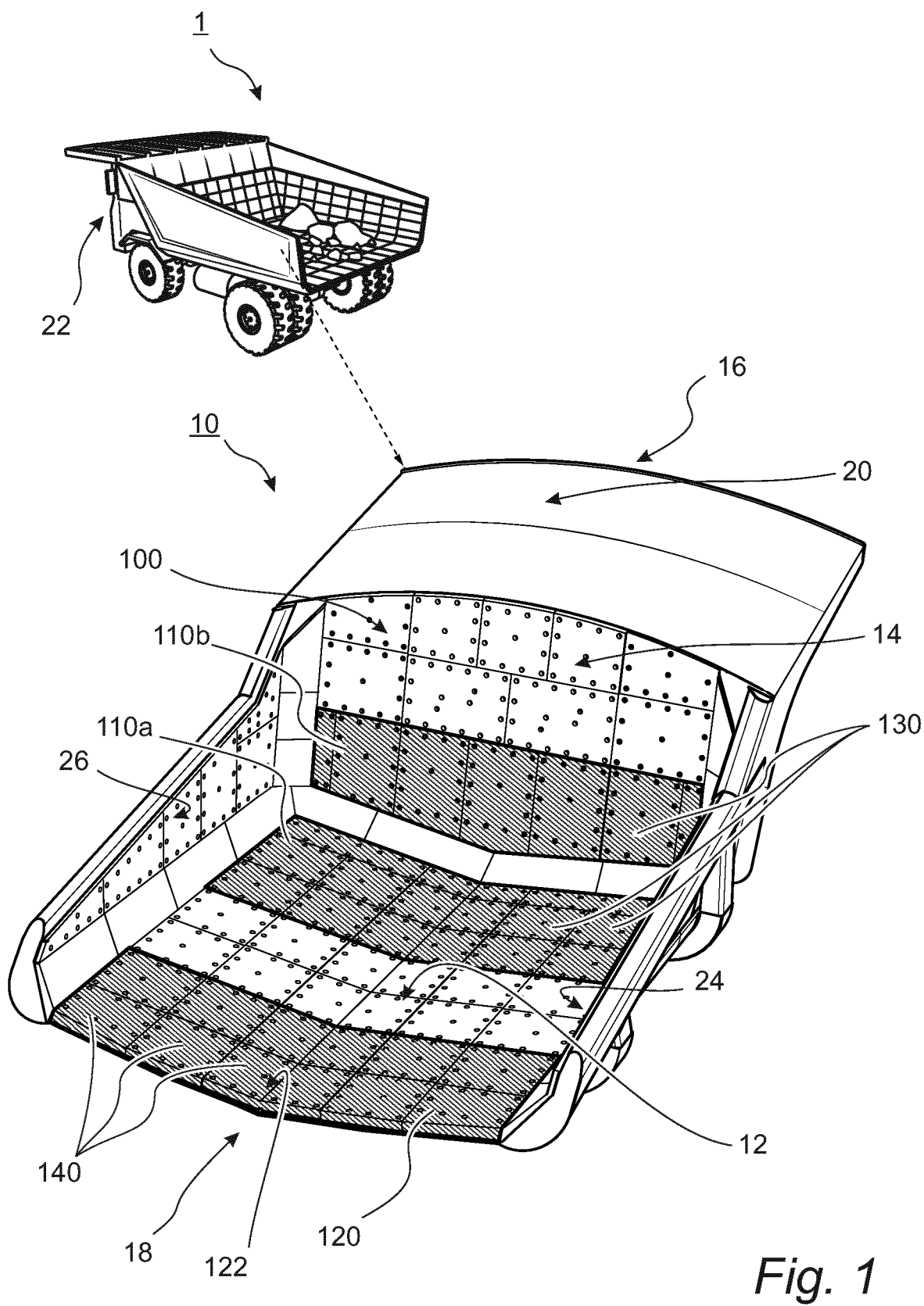
FIG. 1 illustrates a haul truck body having a lining according to some embodiments of the disclosure.

FIG. 1 shows a haul truck body 10 for a haul truck 1. The haul truck 1 is typically an off-highway dump truck engineered for use in high-production mining and heavy-duty construction environments. In use, the haul truck 1 will receive, in the haul truck body 10, a load of material, such as crushed stone, ore or the like, from another machine such as an excavator or a wheel loader. The haul truck 1 may then be used to move the load of material to other areas within a working area, for example to a processing facility such as a crusher. The haul truck 1 is arranged to swivel the haul truck body 10 around a pivot axis at the end of the haul truck 1, such that the load may be tipped off the haul truck body 10.

The haul truck body 10 is made from steel and comprises a front end 16 and a rear end 18. The front end 16 comprises a canopy 20 for protecting the drivers cab 22. The haul truck body 10 comprises a bottom surface 12 connecting to a front surface 14 and two side surfaces 24,26. The front surface 16 connects to the canopy 20.

To protect the haul truck body 10 from damage due to the heavy material being hauled into, and tipped out from the haul truck body 10, surfaces of the haul truck body 10 is covered with a lining 100. As can be seen in FIG. 1, the lining 100 is arranged to extend over inner surfaces of said haul truck body 10. The lining of FIG. 1 will be further described later.

Figure 3A:
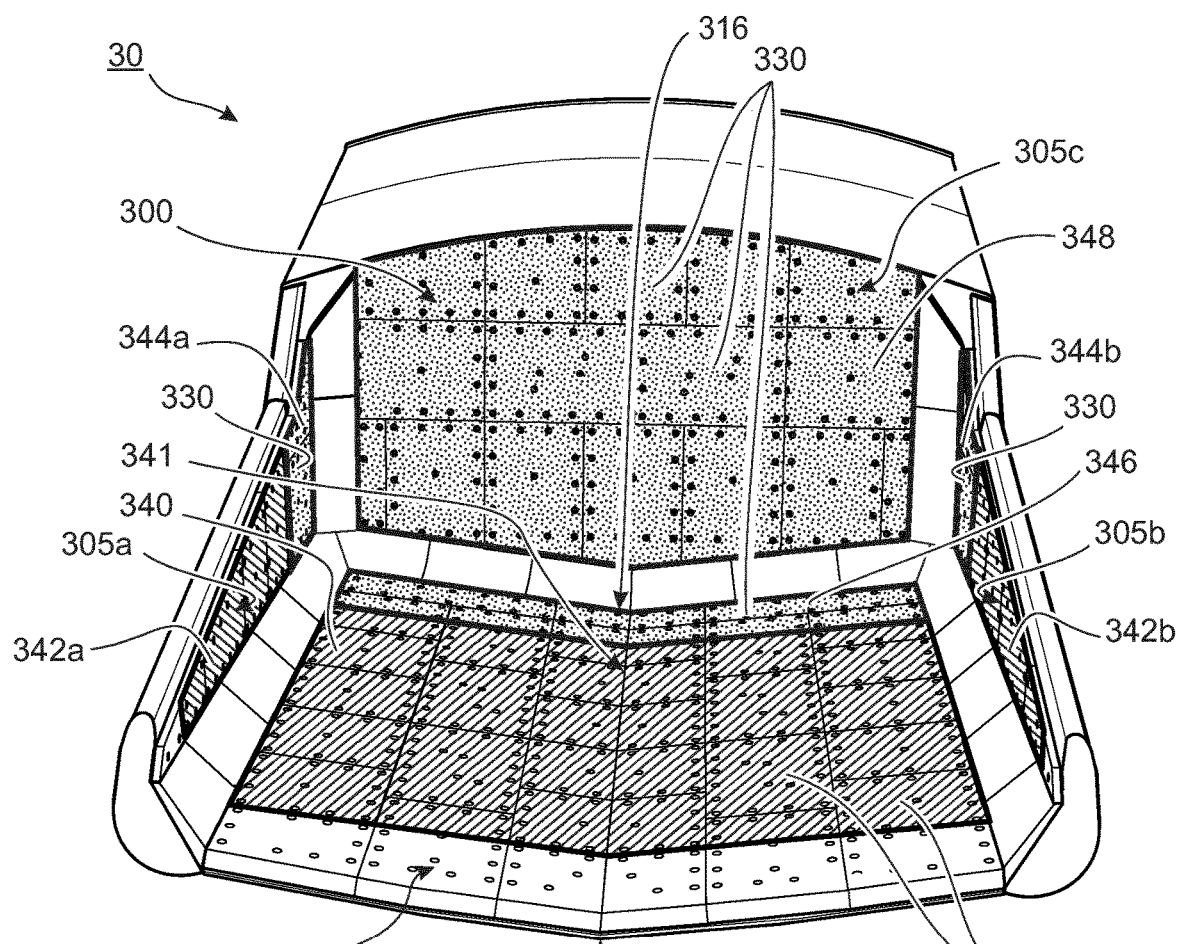
FIG. 3a illustrates a haul truck body having a lining according to some alternative embodiments of the disclosure.
Figure 3B:
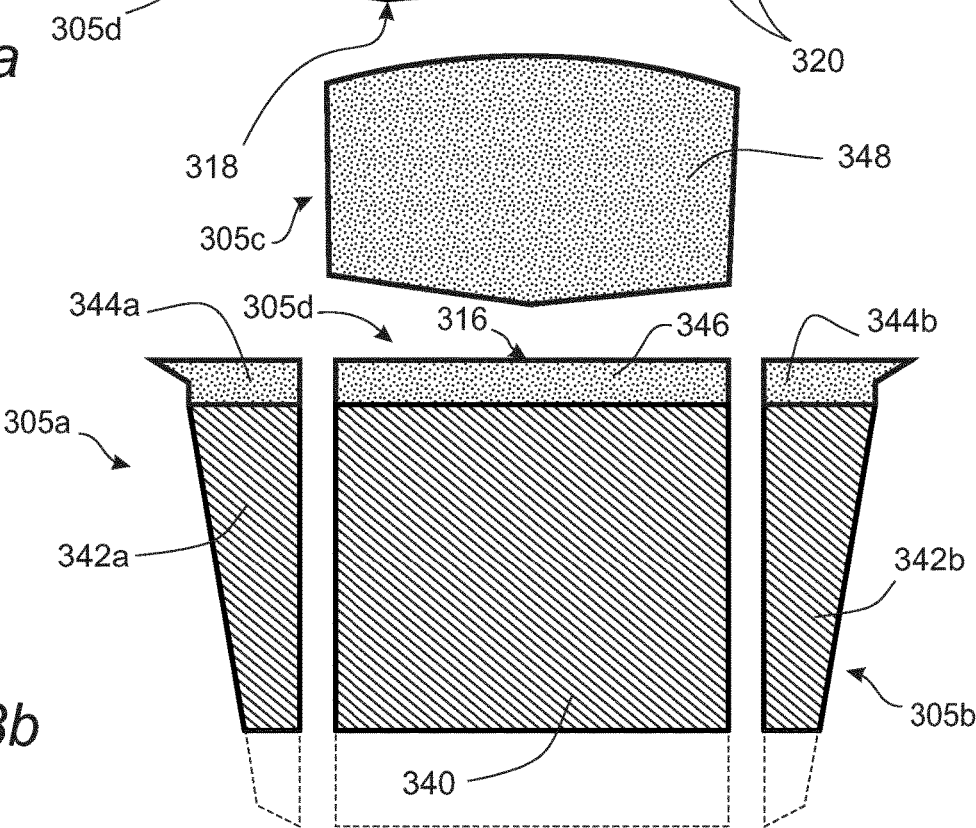

Turning now to FIGS. 3a and b, a lining 300 will now be described. The lining 300 is arranged to extend over a haul truck body 30 for carrying a load. The haul truck body 30 may be entirely or partly lined. The load typically comprises minerals, stones, sand, clay, gravel or the like, and is hauled into the haul truck body 30 at a front portion thereof. Typically, the front portion of the haul truck body 30 covers the front half of the haul truck body 30. Specifically, according to some embodiments, the front portion of the haul truck body 30 covers the front ⅓ of the haul truck body.

The lining 300 is formed by a plurality of lining elements comprising at least a first type of lining elements, termed load-breaking lining elements 320, and a second type of lining elements, different from the load-breaking lining elements 320. In the illustrated embodiment, the lining elements of the second type may be termed load-releasing lining elements 330. The load-breaking lining elements 320 are structured and arranged to restrict, to a higher degree than the second type of lining elements, movement of said load in relation to the lining 300.

The lining 300 comprises a bottom lining 305d, a front lining 305c and two opposite side linings 305a,305b. The bottom lining 305d comprises at least one load-breaking bottom region 340 formed entirely or partly by load-breaking lining elements 320. The lining 300 comprises one or more other regions formed entirely or partly by lining elements of the second type as will be discussed below.

The load-breaking bottom region 340 is arranged at least partly over a load-impact 341 region of a forward part of the haul truck body 30 where the main impact occurs when the load is loaded into the haul truck body 30. In the illustrated embodiment, the load-breaking bottom region 340 is arranged at a distance from a front end 316 of the bottom lining 305d and at a distance from a rear end 318 of the bottom lining 305d. Thus, the load-breaking bottom region 340 may be arranged such as to cover a central region of the bottom lining 305d. In the illustrated embodiment, the load-breaking region 340 extends laterally to the lateral sides of the bottom. In other embodiments, the load-breaking region may be arranged at a distance from the lateral sides of the bottom.

In addition, load-breaking lining elements 320 may be arranged to cover side walls of the haul truck body 30. Specifically, for the embodiment, each one of said two opposite side linings 305a,305b comprises at least one load-breaking side region 342a,342b formed entirely or partly by load-breaking lining elements 320.

The bottom lining 305d further comprises one or more further bottom regions, different from the load-breaking bottom region 340, formed entirely or partly by lining elements of the second type. The lining elements of the second type are designed as load-releasing lining elements 330 which are structured and designed to promote, to a higher degree than the load-breaking lining elements 320, release of the load from the lining and/or movement of the load in relation to the lining 300.

The load-releasing lining elements 330 are typically used at locations where material tend to stick, i.e. locations especially prone to contribute to the carry-back problem. One such location is in the front of the haul truck body. Thus, at least some of said load-releasing lining elements 340 may be arranged in a front lining 305c of the lining. The lining 300 comprises a load-releasing front region 348 covering all, or at least a part, of the front lining 305c. Other load-releasing lining elements 340 may be arranged on the side walls. Specifically, for the lining 300, each one of said two opposite side linings 305a,305b may comprise a forward load-releasing side region 344a,344b formed entirely or partly by load-releasing lining elements 330. Each load-releasing side region 344a,344b may be arranged in front of a respective load-breaking side region 342a,342b on a respective side lining 305a,305b. Other load-releasing lining elements 340 may be arranged within the bottom lining 305d. Specifically, the lining 300 may further comprise a load-releasing bottom region 346 arranged in front of the load-breaking bottom region 340. In alternative embodiments, the load-releasing lining elements 340 may be arranged in the load-releasing front region 348 only or in the forward load-releasing bottom region 346 only.

The load-releasing lining elements 340 may preferably be arranged also at edge and/or corner portions of the lining 300. This may reduce the risk of material sticking to the edge and corner portions to increase the carry-back.

FIGS. 4a and b show a lining 400 according to another embodiment. The lining 400 is similar to the lining 300, but differs in that the lining 400 further comprises an impact region 441 arranged such as to cover at least a part of a central region of the bottom lining 405d where the major part of the load normally impact on the haul truck body 30 during loading. The load-breaking bottom region 440 is arranged at least partly over a load-impact region 341 of a forward part of the haul truck body 30. However, the load-breaking bottom region 440 is arranged to partly surround the impact region 441 such that the load-breaking bottom region 440 covers parts of the bottom lining 405d to the rear of the load-breaking bottom region 440 and parts of the bottom lining 405d at opposite sides of the load-breaking bottom region 440. The lining 400 within the loading region 441 presents one or more lining element resistive for impact. Such a lining element may comprise impact lining elements 130 as disclosed herein.

The lining 400 in FIGS. 4a and 4b further comprises a wear region 443 extending to the rear end 419 of the bottom surface of the haul truck body 30. The lining 400 within said wear region 443 presents one or more lining elements having a relatively high resistance to wear. Such lining elements may comprise wear lining elements 140 as disclosed herein.

The ability of the load-braking lining elements 320 to resist load movement may be achieved in different ways. It may be achieved by the load-carrying surfaces of the load-breaking lining elements 320 presenting, compared to load-carrying surfaces of the lining elements of the second type, a higher surface friction for restricting movement of the load in relation to the lining 300,400. The higher surface friction may be described by the static and dynamic friction coefficients of the lining material. The load-braking lining elements 320 are characterized by having at least a higher static friction than the second type of lining elements. They may, additionally, comprise a higher dynamic friction coefficient than the second type of lining elements. However, a higher static friction coefficient is advantageous as it allows for keeping the load in place rather than merely limiting the speed of a load already moving upon the lining. It is anticipated that it is advantageous to tailor the load-braking lining elements 320 such as to have a certain combination of static and dynamic friction coefficients.

Additionally, or alternatively, the ability of the load-breaking lining elements 320 to resist load movement may be achieved by the load-breaking lining elements 320, compared to the lining elements of the second type, comprising a softer elastic material arranged to be deformed by the weight of the load in order to restrict movement of the load in relation to the lining 300. Such elastic materials may be for example rubber or polyurethane. The deformation results in a load increasing its grip to the lining surface, hence increasing the ability of the load-braking lining element 320 to resist movement.

Additionally, or alternatively, the ability of the load-braking lining elements 320 to resist load movement may be achieved by the load-carrying surfaces of the load-breaking lining elements 320 presenting, compared to load-carrying surfaces of the lining elements of the second type, a lower load-cohesion force for restricting movement of the load in relation to the lining 300.

The properties discussed hereinabove may be combined in different ways to form a suitable load-braking lining element 320. Other properties may also be varied in order to tailor a specific embodiment of a load-braking lining element 320.

ALTERNATIVE EXAMPLE

The inventive concept may be realized in many ways. Hereinbelow will be described an example of a lining that may have some features in common with the lining according to the example embodiments described hereinabove.

FIG. 1 shows a lining 100 being arranged to extend over inner surfaces of said haul truck body 10. The inner surfaces define at least one impact region 110a,110b and at least one wear region 120. The at least one impact region 110a,110b comprises a loading region 110a extending over a part of the bottom surface 12 of the haul truck body 10 and a further loading region 110b extending over at least a part of the front surface 14 of the haul truck body 10. Furthermore, the at least one wear region 120 comprises a tipping region 122 extending over another part of the bottom surface 12 of the haul truck body 10. The tipping region 122 extends to the rear end 18 of the bottom surface 12 of the haul truck body 10. The loading region 110a is arranged in front of the tipping region 122. The loading region 110a extends forwardly from a center of the bottom surface 12 of the haul truck body 10.

The lining 100 within the at least one impact region 110a,110b presents one or more impact lining elements 130. Furthermore, the lining 100 within said at least one wear region 120 presents one or more wear lining elements 140. The impact lining elements 130 have a higher impact resistance than said wear lining elements 140 and the wear lining elements 140 have a higher wear resistance than the impact lining elements 130. The one or more impact lining elements 130 and the one or more wear lining elements 140 are fastened to the haul truck body by means of through bolts, stud welded bolts or any other type of fixing with a down holding force. The one or more impact lining elements 130 and the one or more wear lining elements 140 preferably have the same thickness.

In the example, the one or more impact lining elements 130 comprises a plurality of impact lining elements arranged to extend over the at least one impact region 110a,110b and the one or more wear lining elements 140 comprises a plurality of wear lining elements arranged to extend over the at least one wear region 120. The plurality of impact lining elements 130 are arranged adjacent to each other such as together to form one or more areas of substantially uniform impact resistance. Similarly, the plurality of wear lining elements 140 are arranged adjacent to each other such as together to form areas of substantially uniform wear properties.

The regions outside of the at least one impact region 110a,110b and the at least one wear region 120 may comprise another, different, type of lining elements. Such another type of lining elements may preferably be of the same thickness as the at least one impact lining elements 130 and the at least one wear lining elements 140.

The one or more impact lining elements 130 and the one or more wear elements 140 may comprise different materials. In the example, the one or more impact lining elements 130 and/or the one or more wear lining elements 140 comprise rubber or polyurethane. The one or more impact lining elements 130 have a Young's modulus lower than a Young's modulus of the one or more wear lining elements 140. This allows for the one or more impact lining elements 130 to present better impact resistance than the one or more wear lining elements 140.

Figure 2A:
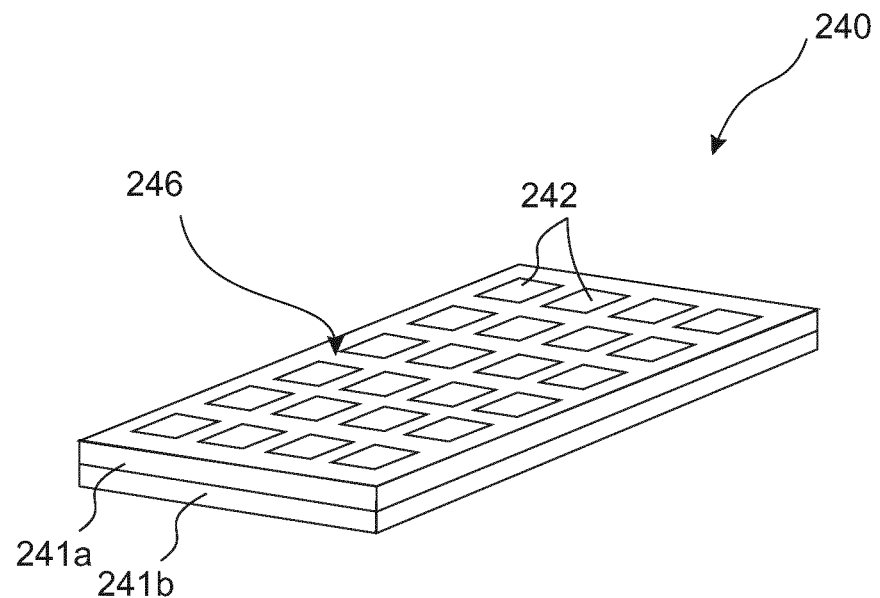
FIG. 2a is a perspective view of a wear lining element according to embodiments of the disclosure.
Figure 2B:
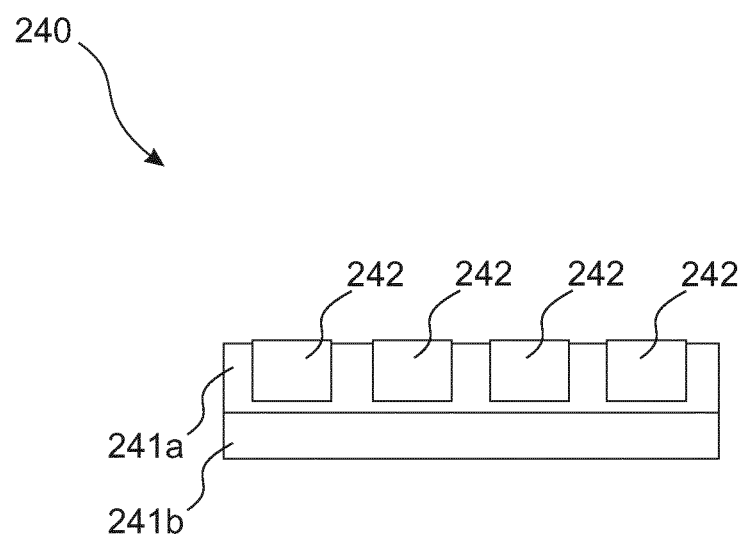

One way to achieve a wear lining element is shown in FIGS. 2a and b, which show a wear lining element 240 comprising more than one material. The wear lining element 240 comprise one or more wear-resistant portions 242 at least partly embedded within the one or more wear lining elements 240 and distributed over at least a part of an outwardly directed surface 246 of the wear lining element 240, such that the one or more wear-resistant portions 242 are arranged to make contact with material present in said haul truck body 10. The one or more wear-resistant elements 242 comprise a ceramic material. The one or more wear lining elements 240 comprises a first layer 241a facing the inside of the haul truck body 10 and a second layer 241b facing surfaces of the haul truck body 10, and wherein the first layer 241a comprises the one or more wear-resistant elements 242. The first layer and the second layer comprises polyurethane. In other words, the one or more wear-resistant elements 242 is partly embedded in polyurethane.

At least some of the properties listed hereinabove may depend not only on the lining material but also on the load residing upon it. It is to be understood that the properties that are to be compared to each other is the properties measurable for each type of lining element when supporting the same load, said load acting as a reference load. For example, the static friction of a load-braking lining element when supporting a load should be compared to the static friction of a lining element of the second type, supporting the same load.

As illustrated in FIG. 4, a lining according to the inventive concept may have impact regions and wear regions within which lining elements are arranged to have a high impact resistance and a high wear resistance, respectively. The lining may, additionally, have load-braking regions and load-releasing regions within which lining elements are arranged to have a relative high load-braking capability and a relative high load-releasing capability, respectively. Two or more of the regions discussed herein may overlap, at least partly. For example, a part of an impact region may also be a load-braking region. In such overlapping regions, lining elements may have more than one functionality. Thus, for the example, a lining element may have a resistance to impact and, additionally, being structured and arranged to restrict movement. It is understood that the impact, wear, load-braking and load releasing regions may be located relative to each other in many alternative ways.

Alternative Embodiments

The embodiment described above and as shown in the figures may be varied in many ways without departing from the scope of the claims.

The lining may comprise more than two types of lining elements. For example, a side lining element may be used on the side surfaces 24,26. Such a side lining element may have properties different from the properties of the impact lining elements and the wear lining elements. For example, the side lining elements may have a different thickness.

The lining may comprise a further type of lining elements arranged over the bottom surface of the haul truck body. Such a further type of lining elements may comprise a lining element with matching, or at least nearly matching, wear and impact properties. Such lining elements may be arranged to extend over a part of the bottom surface located in between the loading portion and the tipping portion.

The wear lining elements and the impact lining elements may comprise different materials to fulfil the requested criteria for wear and impact, respectively. For example, two or more materials may be combined, as layers and/or or a mix and/or as embedded inserts, such as ceramic elements or specific alloys. It should thus be understood that many alternative ways exist for achieving said wear and impact lining elements within the scope of the claims.

The load-braking lining elements and the load-releasing lining elements may comprise different materials to fulfil the requested criteria for restricting movement and promoting release of a load, respectively. For example, two or more materials may be combined, as layers and/or or a mix and/or as embedded inserts, such as ceramic elements or specific alloys. It should thus be understood that many alternative ways exist for achieving said load-braking and load-releasing lining elements within the scope of the claims.

The invention claimed is:

1. A lining being arranged to extend over a haul truck body for carrying a load, said haul truck body having a bottom surface, two side surfaces and a front surface, wherein the lining is formed by a plurality of lining elements comprising at least a first type of lining elements, termed load-breaking lining elements, and a second type of lining elements, different from the load-breaking lining elements, said load-breaking lining elements being structured and arranged to restrict, to a higher degree than the second type of lining elements, movement of said load in relation to the lining,
   wherein said plurality of lining elements comprises an elastic material, and wherein the load-breaking lining elements, compared to the lining elements of the second type, comprises a softer elastic material arranged to be deformed by the weight of the load in order to restrict movement of the load in relation to the lining,
   wherein the lining comprises a load-breaking bottom region formed entirely or partly by the load-breaking lining elements, and one or more further bottom regions, different from the load-breaking bottom region, formed entirely or partly by the lining elements of the second type,
   wherein the load-breaking bottom region extends laterally between respective lateral sides of the bottom surface, and
   wherein the load-breaking bottom region extends rearward of one or more further bottom regions.

2. A lining according to claim 1, wherein load-carrying surfaces of the load-breaking lining elements present, compared to load-carrying surfaces of the lining elements of the second type, a higher surface friction for restricting movement of the load in relation to the lining.

3. A lining according to claim 1, wherein load-carrying surfaces of the load-breaking lining elements present, compared to load-carrying surfaces of the lining elements of the second type, a lower load-cohesion force for restricting movement of the load in relation to the lining.

4. A lining according to claim 1, wherein said lining comprises a bottom lining, a front lining and two opposite side linings.

5. A lining according to claim 4, wherein the load-breaking bottom region is arranged at least partly over a load-impact region of a forward part of the haul truck body.

6. A lining according to claim 4, wherein the load-breaking bottom region is arranged at a distance from a front end of the bottom lining.

7. A lining according to claim 4, wherein the load-breaking bottom region is arranged at a distance from a rear end of the bottom lining.

8. A lining according to claim 4, wherein each one of said two opposite side linings comprises at least one load-breaking side region formed entirely or partly by the load-breaking lining elements.

9. A lining according to claim 1, wherein the second type of lining elements are designed as load-releasing lining elements which are structured and designed to promote, to a higher degree than the load-breaking lining elements, release of the load from the lining and/or movement of the load in relation to the lining.

10. A lining according to claim 9, wherein at least some of said load-releasing lining elements are arranged in a front lining of said lining.

11. A haul truck body comprising a lining according to claim 1.

12. A truck comprising a haul truck body according to claim 11.

* * * * *